United States Patent [19]

Hamant et al.

[11] Patent Number: 5,582,366
[45] Date of Patent: Dec. 10, 1996

[54] SATELLITE FUELING SYSTEM AND METHOD THEREFOR

[75] Inventors: James E. Hamant, Tempe; John R. McBride, Phoenix; David H. Cubbage, Chandler, all of Ariz.

[73] Assignee: Motorola, Inc., Schaumburg, Ill.

[21] Appl. No.: 375,038

[22] Filed: Jan. 19, 1995

[51] Int. Cl.$^6$ ............... B69F 1/28; B60D 37/16; B67D 5/54; F04F 1/00
[52] U.S. Cl. .............. 244/135 A; 244/135 R; 244/63; 244/158 R; 137/209
[58] Field of Search ............... 244/63, 135 R, 244/135 A, 158 R, 161; 13/209

[56] References Cited

U.S. PATENT DOCUMENTS

| | | | |
|---|---|---|---|
| 3,262,654 | 7/1966 | Kaempen | 244/161 |
| 3,363,570 | 1/1968 | Scott | 137/209 |
| 3,443,475 | 5/1969 | Berton . | |
| 4,932,609 | 6/1990 | Secchiaroli et al. | 244/135 R |
| 5,129,599 | 7/1992 | Wollen | 244/135 R |
| 5,141,181 | 8/1992 | Leonard | 244/158 R |
| 5,198,945 | 9/1992 | Geatz | 137/209 |

OTHER PUBLICATIONS

"NewSatellite Loading Process Fuels Multiple Improvements", Author and Date unknown.

*Primary Examiner*—Andres Kashnikow
*Assistant Examiner*—Lissi Mojica
*Attorney, Agent, or Firm*—Gregory J. Gorrie

[57] ABSTRACT

A self-contained fueling module (10) provides the exact amount of hydrazine necessary to fuel a satellite (50) prior to launch. The fueling module (10) includes a propellant tank (14), a vacuum tank (12) and a pressurant tank (16). The propellant tank, filled with hydrazine, is shipped to the launch site where it is installed in the fueling module. Prior to launch, the fueling module is connected to the satellite and the hydrazine is driven with Helium pressurant into the satellite fuel tank. The Helium also pressurizes the satellite fuel tank to flight pressure. Any remaining fuel is evacuated from the connections (45) and fuel transfer lines (42) with the vacuum tank. Personnel do not have to wear self-contained atmospheric pressurized environment (SCAPE) suits because there is no risk of hydrazine exposure.

20 Claims, 2 Drawing Sheets

SATELLITE FUELING SYSTEM AND METHOD THEREFOR

FILED OF THE INVENTION

The present invention relates generally to satellite fueling operations. More specifically, the present invention relates to loading of fuel such as hydrazine, onto satellites at a launch site.

BACKGROUND OF THE INVENTION

All satellites require fuel for their rocket engines and thrusters. Typical propellant systems use hydrazine ($N_2H_4$) and blends of hydrazine. Hydrazine and hydrazine blends are hazardous materials because of their corrosive, caustic, explosive and toxic properties. Special care must be taken in transportation and handling of these propellant fuels. Special procedures are also required by government agencies.

Propellant fuels must be loaded on board a satellite prior to launch. Hydrazine, for example, is generally transported to a launch site in standard fifty-five gallon drums. In vapor state, hydrazine can auto-decompose from catalytic effects or electric spark at such a rapid rate as to cause an explosion. Hydrazine is toxic and is easily ingested or absorbed through the skin. The National Institute for Occupational Safety and Health (NIOSH) recommends extreme caution in handling hydrazine to reduce the risk of cancer induced by exposure to hydrazine. The NIOSH proposed standards state that work place air concentrations should be controlled so that employees are not exposed to concentrations greater than 0.04 mg/m$^3$ (0.03 ppm) during any 15-minute sample period. Additional information on hydrazine can be found in "Studies of Evaporation of Hydrazine and Procedures for Cleanup of Small Spills", U.S. Department of Commerce, AD-A064 675.

The hazardous properties of hydrazine require special certification of containers and transportation modes as well as special handling. Spills are considered hazardous events and the potential of spills during handling of hydrazine requires special handling procedures. During handling operations where spills are possible, personnel are required to wear self-contained atmospheric pressurized environment (SCAPE) suits. All non-essential personnel must be removed from areas where there is a potential for exposure to hydrazine.

Traditional satellite fueling operations have been done using a fueling cart, 55 gallon drums of hydrazine, tanks of liquid Nitrogen ($LN_2$), tanks of Helium or gaseous Nitrogen ($GN_2$), isopropyl alcohol and waste tanks. Approximately six people wearing SCAPE suits are required for between four and eight hours for the fueling of a satellite. Traditional setup and fueling procedures for a satellite are complex and dangerous.

Those of skill in the art are aware that there are many disadvantages and difficulties associated with these traditional satellite fueling operations. These disadvantages include a higher probability of spills because SCAPE suits must be worn for much of the fueling operation. Due to the bulky nature of these suits, all operations which involve them are inefficient and increase the likelihood that an inadvertent spill would happen due to bumping equipment, for example. In addition, SCAPE suits are very expensive and significantly increase the cost of satellite fueling operations.

Another disadvantage to traditional satellite fueling operations is that there is no way to remove residual fuel from connections which are made between the satellite and the fuel cart. Residual fuel is a serious health and environmental hazard. As a result, drips of hydrazine must be contained and disposed.

Another disadvantage to traditional satellite fueling operations is that the fuel (usually hydrazine or a hydrazine blend) is transported from a supplier in a 55 gallon drum. The 55 gallon drums are bulky and difficult to work with increasing the risk of spills. The drums are opened at the launch site and fuel vapors are released into the atmosphere. Atmospheric exposure increases the risk of potential contamination of the fuel. Fuel that becomes contaminated can no longer be used and must be discarded. Discarding fuel requires special procedures because the fuel is a hazardous material.

Another disadvantage to traditional satellite fueling operations is that the amount of fuel in a 55 gallon drum is typically in excess of what a satellite requires. To deliver the proper amount of fuel, traditional satellite fueling operations typically require weighing the fuel at the fueling site. The weighing process is time consuming and increases the risk of improperly filling the satellite fuel tank because of potential human error. A 55 gallon drum cannot be emptied completely and the excess fuel must be discarded. Another problem with the use of 55 gallon drums is that the United States Department of Transportation (DOT) has recently forbid the transportation of hydrazine in 55 gallon drums.

Another disadvantage to traditional satellite fueling operations is that a typical fueling cart requires attaching a 55 gallon fuel drum, a waste drum, an isopropyl alcohol drum, waste vapor vents and Helium or gaseous Nitrogen ($GN_2$) bottles. It also requires multiple attachments to the satellite. Each of these connections represents an opportunity for spills and exposure. Furthermore, each connection is time consuming. Launch facilities must have waste vapor vents capable of handling hydrazine or provide a hazardous vapor scrubber.

Another disadvantage to traditional satellite fueling operations is that the fueling carts are complex resulting in a low mean time between failures (MTBF). As a result of a low MTBF, spare parts are stocked and special training is required for personnel at the fueling site for repair of the fueling cart. In addition, the complex operation of traditional fueling carts does not allow non-specialist technicians to perform the fueling operations. The need for specially trained personnel significantly increases the cost of traditional satellite fueling operations. Another disadvantage is that a traditional fueling cart requires electricity to power vacuum pumps and control systems. The use of electricity significantly increases the risk of sparks and explosions.

As can be seen, traditional satellite fueling operations are dangerous, time consuming and expensive, and require disposal of significant hazardous waste. With traditional satellite fueling operations, only one satellite is typically prepared for launch. However, when many satellites are launched on a single platform, traditional fueling approaches are too time consuming and expensive. Traditional approaches are also impractical when many satellites need to be launched on a regular basis.

Thus what is needed are a method and apparatus that fuel satellites in a safe, quick and cost efficient manner while reducing the amount of hazardous waste. What is also needed are a method and apparatus for fueling satellites that are totally self-sufficient and require no external utilities.

What is also needed are a method and apparatus for fueling satellites that do not require personnel to wear SCAPE suits. What is also needed are a method and apparatus for fueling satellites that remove residual fuel from the connections to a satellite without exposing the residual fuel to the atmosphere. What is also needed are a method and apparatus for fueling satellites that eliminate the use of 55 gallon drums, prevent fuel waste and contamination of the fuel so that no fuel needs to be disposed.

What is also needed are a method and apparatus for fueling satellites that do not require weighing the fuel at the launch site and eliminate the waste drum, the isopropyl alcohol drum and waste vapor vents. Thus what is also needed are a method and apparatus that reduce the number of connections made during satellite fueling operations and eliminate the requirement that the launch facilities have waste vapor vents or a hazardous vapor scrubber capable of handling hydrazine.

DETAILED DESCRIPTION OF THE DRAWINGS

Figure 1:
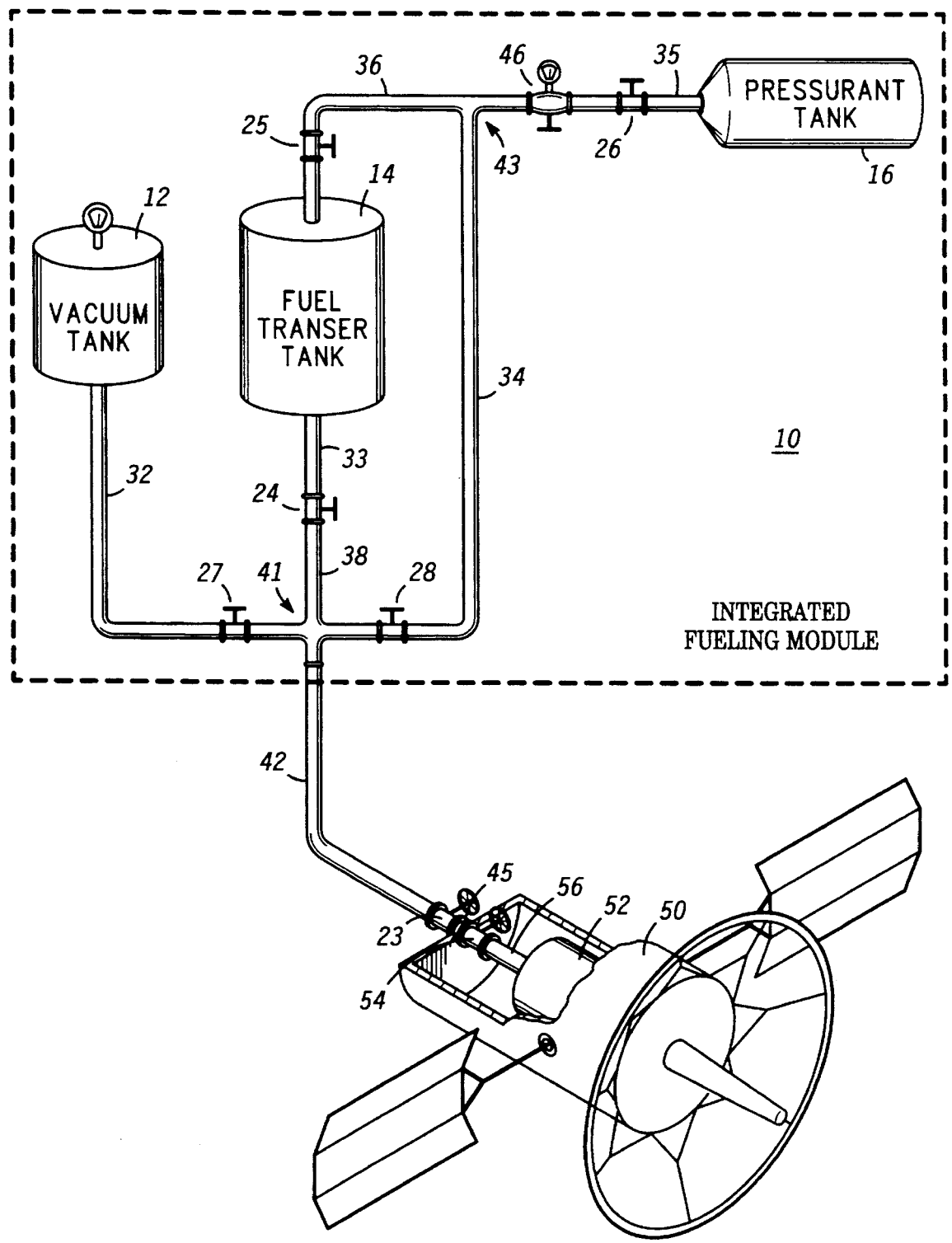
FIG. 1 illustrates a block diagram of a satellite and an integrated fueling module suitable for use in a preferred embodiment of the present invention.

The present invention provides, among other things, a fully contained satellite fueling system that is totally self-sufficient and requires no external utilities. It includes a required amount of purified propellant, pressurant, a vacuum tank and transfer lines to fuel a satellite before launch. The present invention also provides an improved method of loading propellant onto a satellite.

A "satellite" is defined herein to mean any man-made object or vehicle intended to orbit earth or leave earth's atmosphere and that requires propellant to maintain its orbit or flight path. The term "satellite" is intended to include both geostationary and orbiting satellites and/or combinations thereof including low earth orbiting (LEO) satellites.

A typical traditional procedure for fueling a satellite requires a fueling cart, 55 gallon drums of hydrazine, tanks of liquid Nitrogen ($LN_2$), tanks of pressurant such as Helium or gaseous Nitrogen ($GN_2$), isopropyl alcohol and waste tanks. A traditional fueling cart includes fill tools for the propellant and the pressurant. Transfer lines are connected to the satellite, vented and leak tested. The isopropyl alcohol and waste tanks are set up and eductors are inserted. The hydrazine drum is placed on scale platform and weighed. An eductor assembly is inserted into the hydrazine drum, connected to the fueling cart and leak tested. The hydrazine drum is then pressurized with pressurant to approximately 15 psi using the fueling cart. During this operation, all personnel are required to wear expensive, self-contained atmospheric pressurized environment (SCAPE) suits because of the risk of exposure to hydrazine.

In traditional fueling operations, the fueling cart is connected to facility 115 V AC power for the vacuum pumps and control systems which monitor temperature and pressure. A $LN_2$ cold trap is filled so that no water vapor or hazardous material enters the vacuum pump. The propulsion system and transfer lines are evacuated to approximately 1 torr using a vacuum pump on the fueling cart. A hydrazine eductor valve and fueling cart flow control valve are opened so that hydrazine is transferred into the satellite fuel tank under the 15 psi pressure.

In traditional fueling operations, the satellite fuel tank is then pressurized to approximately 50 psi with pressurant while the pressure and temperature of the satellite fuel tank are monitored for any indication of incompatibility or leakage. A pressurant fill valve is opened and the satellite fuel tank is then pressurized to flight pressure which is generally between 300 and 600 psi. The fuel transfer lines are then flushed with isopropyl alcohol and purged with pressurant to dilute any remaining residual hydrazine.

In traditional fueling operations, the fill tools are disconnected from the satellite. Personnel must also wear SCAPE suits for this operation also. The satellite fuel tank pressure and temperature are continuously monitored for signs of incompatibility or leakage. The hydrazine drum is disconnected and the isopropyl alcohol and waste drums are left attached for detanking operations, if required. A detanking operation dumps the propellant from the satellite fuel tank into the waste drum, flushes it with isopropyl alcohol and purges it with Helium.

In a preferred embodiment of the present invention, an integrated fueling module is provided for a satellite, or in the case when several satellites are being fueled, one integrated fueling module is provided for each satellite. An operator only needs to turn the appropriate valves to pressure the fuel and pressurize the satellite fuel tank since the propellant and pressurant quantities are pre-weighed and pre-measured. This simplicity of operation will be apparent to those of skill in the art after reading the description below.

FIG. 1 illustrates a block diagram of a satellite and an integrated fueling module suitable for use in a preferred embodiment of the present invention. Satellite 50 includes, among other things, satellite fuel tank 52 and valve 54 coupled by high pressure line 56. Integrated fueling module 10 includes vacuum tank 12, fuel transfer tank 14, pressurant tank 16 and adjustable pressure regulator 46. Adjustable pressure regulator preferably has a range of adjustment from at least 100 to 500 psi. Valve 26 couples pressurant tank 16 and an input of pressure regulator 46. An output of pressure regulator 46 is coupled to three-way tee 43 which connects to valves 28 and 25. Valve 25 couples to an input of fuel transfer tank 14, and valve 28 couples to a first port of four-way connector 41 as shown. Valve 24 is coupled between an output of fuel transfer tank 14 and a second port of four-way connector 41. Valve 27 is coupled between vacuum tank 12 and a third port of four-way connector 41.

The output of integrated fueling module 10 is a fourth port of four-way connector 41. Low pressure line 32 couples to vacuum tank 12 while high pressure lines 33, 34, 35, 36 and 38 couple between other elements as shown. Those of skill in the art will understand that additional lines, valves and other components may be required than what is shown in FIG. 1.

Integrated fueling module 10 also includes a lightweight frame (not shown) that is corrosion resistant and compatible with the propellant. Aluminum is one material that may be used. The frame is preferably coupled to casters or wheels mounted so that module 10 can be easily moved. The frame desirably has integral fork lift pockets, a lifting ring for crane operations and tie down points.

The output of integrated fueling module 10 is coupled to an external high pressure fuel transfer line 42 which is coupled to valve 23. Valve 23 and valve 54 are coupled together at connection 45 prior to fueling the satellite.

In the preferred embodiments, pressurant tank 16 is filled with an inert gas such as compressed Nitrogen or compressed Helium and is desirably pressurized to between 1200 and 2000 pounds per square inch (psi). Pressurant tank 16 is preferably a United States Department of Transportation (DOT) approved pressure vessel rated to at least 2000 psi having at least a 40 standard cubic foot (scf) capacity. The pressurant is desirably certified to meet the requirements of MIL-P-27407 grade B.

Fuel transfer tank 14 is preferably filled with a satellite propellant such as hydrazine ($N_2H_4$), monomethyl-hydrazine or a hydrazine blend. However, virtually any propellant or oxidizer may be contained in fuel transfer tank 14. Preferably, fuel transfer tank 14 contains between 100 and 400 pounds of hydrazine and is pressurized at a relatively low pressure of approximately 100 psi to prevent contamination. The propellant desirably meets purity requirements of MIL-P-26538. The propellant and the pressurant are desirably chosen so as not to react with each other.

In a preferred embodiment, fuel transfer tank 14 is a fuel container in accordance with USDOT 178.61 specification 4BW exemption E11173 and having a high working pressure rating of at least 500 psi and having a test pressure rating of at least 750 psi. Fuel transfer tank 14 may be fabricated from a high strength carbon steel but may also be fabricated from a stainless steel to allow for hydrazine compatibility. In the preferred embodiment, 304L stainless steel is used.

Vacuum tank 12 is preferably fabricated in accordance with USDOT 178.61 specification 4BW exemption E11173 and may also be fabricated from a stainless steel to allow for hydrazine compatibility. In the preferred embodiment, the size of vacuum tank 12 is at least eight gallons with a volume of approximately one cubic foot. Vacuum tank 12 is preferably evacuated to a pressure of approximately 0.2 psia.

In the preferred embodiment, transfer lines, fittings and piping are constructed from a stainless steel, such as 304L and other hydrazine compatible materials. Preferably, high pressure fuel transfer line 42 is a flexible Teflon-lined hose having a surrounding stainless steel braid.

In addition to providing for filling satellite fuel tank 52 with propellant, in a preferred embodiment, integrated fueling module 10 includes lines and connections (not shown) to remove propellant from satellite fuel tank 52. Those of skill in the art will understand how to provide the additional connections and components for this task.

Figure 2:
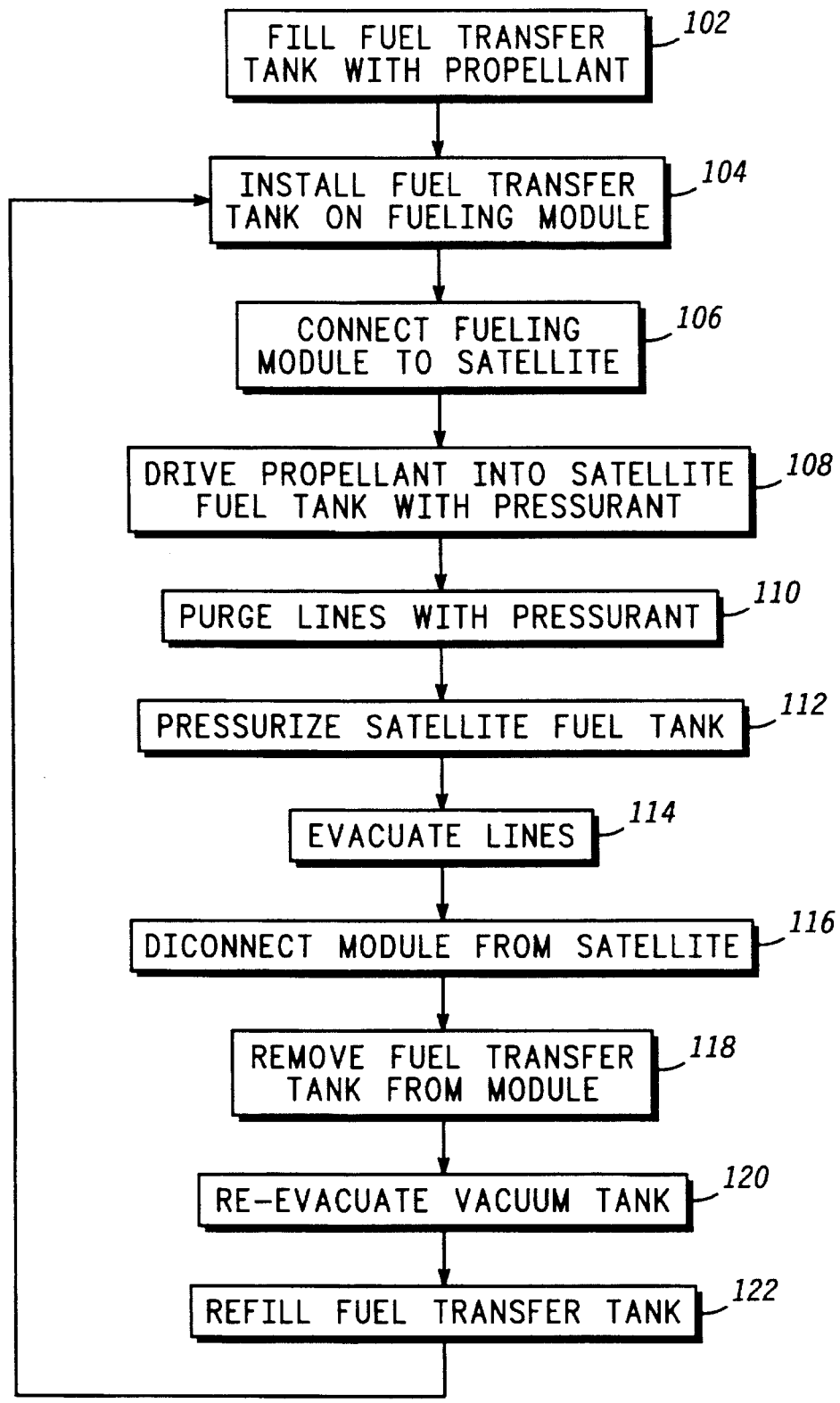
FIG. 2 shows a flow chart of a satellite fueling procedure suitable for use in a preferred embodiment of the present invention.

FIG. 2 shows a flow chart of satellite fueling procedure 100 suitable for use in a preferred embodiment of the present invention. As mentioned above, when propellant is to be loaded onto a satellite, integrated fueling module 10 (FIG. 1) is provided for each satellite. The result of procedure 100 is to fill and pressurize satellite fuel tank 52 (FIG. 1) with the necessary propellant prior to launch. Procedure 100 also prepares the integrated fueling module for reuse.

In task 102, fuel transfer tank 14 (FIG. 1) is filled with propellant. In one embodiment of the present invention, fuel transfer tank 14 may be sent to a propellant supplier by either surface or air and the propellant supplier fills fuel transfer tank 14 with a predetermined amount of propellant. The predetermined amount of propellant is approximately the amount required by satellite fuel tank 52 (FIG. 1) within plus or minus one pound. As those of skill in the art will understand, the exact procedures employed in filling fuel transfer tank 14 are not important for the present invention. In this embodiment, fuel transfer tank 14 is sealed and shipped from the propellant supplier to the launch facility where the satellites to be fueled are located.

In task 104, fuel transfer tank 14 is installed in integrated fueling module 10. All valves are preferably checked to make sure that they are closed so no leakage results. In a preferred embodiment, pressurant tank 16 (FIG. 1) is filled with pressurant as part of task 102. In one embodiment, pressurant tank 16 is removed and replaced with a similar tank filled with pressurant by a local supplier. Pressurant tank 16 is then installed on integrated fueling module 10 as part of task 104.

In another embodiment, pressurant tank is filled without removing it from module 10. For example, high pressure line 35 is disconnected from pressurant tank 16 and pressurant tank 16 is filled with pressurant. High pressure line 35 is then reconnected to pressurant tank 16. The pressure of the filled tank is sufficiently high to pressurize satellite fuel tank 52 (FIG. 1) to flight pressure. Those of skill in the art will understand how to determine the amount of pressure required.

In an alternative embodiment of the present invention, tasks 102 and 104 are performed by a propellant supplier. For example, integrated fueling module 10 (FIG. 1) is sent to the propellant supplier where fuel transfer tank 14 and pressurant tank 16 are removed from integrated fueling module 10. The propellant supplier fills fuel transfer tank 14 with the requested propellant and fills pressurant tank 16 with pressurant. Both tanks are installed back on integrated fueling module 10 and the assembly is shipped to the launch site.

In addition to the steps performed in tasks 102 and 104 discussed above, Vacuum tank 12 is preferably evacuated to an initial pressure below atmospheric pressure and installed on integrated fueling module 10 prior to performing tasks 106–122.

In task 106, integrated fueling module 10 is connected to satellite 50. High pressure fuel transfer line 42 is coupled to the output of integrated fueling module 10 (i.e., the fourth port of four-way connector 41) and valve 23. Valve 23 and valve 54 are coupled together at connection 45 (FIG. 1). At this point in procedure 100, the propellant from fuel transfer tank 14 is ready to be transferred to satellite fuel tank 52.

In task 108, propellant is driven from fuel transfer tank 14 to satellite fuel tank 52. Regulator 46 (FIG. 1) is desirably set to between 100 and 150 psi and preferably around 120 psi. Valve 26 is opened releasing pressurant from pressurant tank 16 which pressurizes high pressure lines 34 and 36. Valve 25 is opened, followed by the opening of valves 24, 23 and 54 respectively. When valve 54 is opened, propellant from fuel transfer tank 14 is driven through flexible high pressure fuel transfer line 42 into satellite fuel tank 52. After a short period of time, all propellant will have been transferred from fuel transfer tank 14 to satellite fuel tank 52. After all propellant is transferred, pressurant from pressurant tank 16 starts to flow into satellite fuel tank 52.

In task 110, the pressurant from pressurant tank 16 is used to purge high pressure fuel transfer line 42, valve 23, connection 45 and valve 54. Purging with pressurant removes the majority of the propellant that remains in the lines and connections. The purging with pressurant continues until pressure within the system equalizes including the pressure within satellite fuel tank 52. The pressure equalizes at approximately whatever pressure regulator 46 has been set. Desirably, satellite fuel tank 52 will be pressurized to a nominal pressure between 100 and 150 psi.

In regard to tasks 108 and 110, one of ordinary skill in the art may employ several ways to determine when all propellant from fuel transfer tank 14 has been transferred and pressure in the system has equalized. For example, a sight glass located in high pressure line 38 may be used or a pressure gauge may also be installed at connector 41 so that the pressure and rate of change may be observed during procedure 100. Alternatively, the pressure in satellite fuel tank 52 may be observed.

In task 112, satellite fuel tank 52 is pressurized to a level necessary for satellite operations. Satellite fuel tank 52 is desirably pressurized to between 400 and 500 psi. To accomplish task 112, valves 24 and 25 are closed and regulator 46 is set to the desired pressure level. Valve 28 is opened and the pressurant from pressurant tank 16 flows through high pressure fuel transfer line 42 into satellite fuel tank 52. As those of skill in the art will understand, heat may be generated in satellite fuel tank 52 due to the increasing pressure in satellite fuel tank 52. The temperature of the pressurant in satellite fuel tank 52 is preferably limited by controlling the rate of pressurization of satellite fuel tank 52. In one embodiment of the present invention, the size of valve 28 is limited to prevent a pressurant flow rate which would allow excessive temperatures in satellite fuel tank 52. In another embodiment, an orifice at the inlet of three-way tee 43 limits the pressurant flow rate.

After the pressurant cools and the pressure in the lines and satellite fuel tank 52 equalizes, valve 28 is closed and then valve 54 is closed. Valve 26 may also be closed. At this point in procedure 100, the filling and pressurizing of satellite fuel tank 52 is complete. The remaining tasks of procedure 100 address, among other things, clean up and preparations for reuse of integrated fueling module 10.

In task 114, valve 27 is opened to evacuate contaminated pressurant from high pressure fuel transfer line 42, valve 54, valve 23 and connection 45 into vacuum tank 12. The pressurant in these areas may have been contaminated by being exposed to residual propellant that remained from the fuel transfer process. The vacuum removes this contaminated pressurant from these areas and also removes any remaining propellant. Because these areas have been purged with pressurant in task 108 discussed above, very little propellant remains, but due to the hazardous nature of the propellant, task 114 removes any that remains. After the contaminated pressurant is removed, valve 23 is closed and then valve 27 is closed. Any remaining propellant at connection 45 has been removed by task 114 and therefore no propellant is exposed to personnel or the environment.

Vacuum tank 12 eliminates the venting of any vapors to the atmosphere and reduces the amount of pressure in the lines prior to decoupling high pressure fuel transfer line 42 with the satellite. The use of vacuum tank 12 eliminates the requirement of scrubbers which have traditionally been used to minimize the amount of propellant vapors that escape into the atmosphere. Scrubbers are not always reliable and the scrubbing media must be removed and treated as hazardous waste.

In task 116, integrated fueling module 10 and satellite 50 are decoupled at connection 45. There is no risk of contamination of the outside environment with either liquid or vapor propellant because all propellant is removed from connection 45. Furthermore, a vacuum exists at connection 45.

At this point in procedure 100, satellite fuel tank 52 has been filled with propellant and pressurized, and integrated fueling module has been disconnected. The satellite is ready for launch. Tasks 118–122 may be performed at any time, either before or preferably after the satellite is launched.

In one embodiment, fuel transfer tank 14 and vacuum tank 12 are removed from integrated fueling module 10 and shipped to the propellant supplier where fuel transfer tank is refilled and vacuum tank 12 is re-evacuated. In an alternative embodiment, integrated fueling module 10 is shipped to the propellant supplier with fuel transfer tank 14 and vacuum tank 12 installed. In this embodiment, tasks 118 through 122 are performed at the propellant supplier. In task 120, vacuum tank 12 is re-evacuated. Preferably, contaminated pressurant is removed from vacuum tank 12 by the propellant supplier. In one embodiment of the present invention, vacuum tank 12 is large enough to allow multiple satellite fueling operations without re-evacuating vacuum tank 12.

In task 122, fuel transfer tank 14 is refilled with propellant as discussed in task 102. The propellant supplier sends the filled fuel transfer tank 14 back to the launch site. Tasks 104–122 are then repeated for subsequent fueling operations on a subsequent satellite. In the alternative embodiment, the propellant supplier sends back the entire integrated fueling module 10 and tasks 104–122 are repeated.

In addition to the tasks shown in procedure 100, other tasks not shown may be necessary to prepare integrated fueling module 10 for filling satellite fuel tank 52 with propellant and pressurant. These tasks include, among other things, replacing the pressurant, verifying proper operation of valves and the pressure regulator and performing leak tests on the high pressure lines. Those of skill in the art will be able to provide other tasks as required.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provides an improved satellite fueling system and method. One advantage to the present invention is its simplicity of operation. The integrated fuel module is connected to a satellite, or in the case when several satellites are being fueled, a fueling module is connected to each satellite. The operator simply turns the appropriate valves to pressure the fuel and pressurize the satellite fuel tank since the propellant and pressurant quantities are pre-weighed.

Yet another advantage includes increased user safety by eliminating exposure of propellant to the environment. Another advantage is that no flow meters are required and no measuring of the propellant is necessary at the launch site. Another advantage is the elimination of the need for SCAPE suits because no propellant is exposed to personnel or the environment. Another advantage is that no propellant is wasted because only the required amount is provided for the satellite. Other advantages include virtually no opportunity for contamination of the propellant and the elimination of the disposal problems associated with contaminated and unused propellant. Another advantage is that no hazardous vapor scrubbers are required. These advantages result in a significant cost savings especially for programs that launch many satellites.

What is claimed is:

1. A method of loading propellant from an integrated fueling module into a satellite fuel tank, said integrated fueling module including a fuel transfer tank with a predetermined amount of propellant, said fuel transfer tank having an input and an output, a pressurant tank filled with a pressurant and having an output coupled to said input of said fuel transfer tank, and a vacuum tank coupled to said output of said fuel transfer tank, said method comprising the steps of:

(a) providing said integrated fueling module;

(b) driving said predetermined amount of propellant from said fuel transfer tank through a fuel transfer line into said satellite fuel tank using said pressurant; and (c) evacuating a remaining amount of said propellant from said fuel transfer line into said vacuum tank.

2. A method as claimed in claim 1 wherein said output of said fuel transfer tank and said vacuum tank are connected to an output of said integrated fueling module, and wherein the method further comprises the step of connecting said output of said integrated fueling module to said satellite fuel tank with said fuel transfer line.

3. A method as claimed in claim 1 wherein said integrated fueling module includes a valve on the output of said pressurant tank and an adjustable pressure regulator coupled between said valve and said input of said fuel transfer tank, and wherein the driving step further comprises the steps of:

setting said adjustable pressure regulator; and opening said valve.

4. A method as claimed in claim 1 further comprising the steps of:

purging said fuel transfer line with said pressurant;

pressuring said satellite fuel tank to within a predetermined range using said pressurant; and disconnecting said fuel transfer line from said satellite fuel tank.

5. A method as claimed in claim 1 wherein the providing step further comprises the steps of:

receiving said fuel transfer tank filled with said predetermined amount of propellant; and installing said fuel transfer tank on said integrated fueling module.

6. A method as claimed in claim 1 wherein the providing step further comprises the step of providing said integrated fueling module including said fuel transfer tank with said predetermined amount of propellant wherein said propellant is hydrazine and wherein said predetermined amount is within plus or minus one pound of an amount of hydrazine required for said satellite fuel tank, and wherein the providing step also comprises the step of providing said integrated fueling module including said pressurant tank with pressurized Helium.

7. A method as claimed in claim 6 wherein the providing step is performed by a propellant supplier and comprises the step of shipping said integrated fueling module to a launch site.

8. A method as claimed in claim 6 wherein the providing step includes the steps of:

shipping said fuel transfer tank with said predetermined amount of propellant from a propellant supplier to a launch site; and installing said fuel transfer tank in said integrated fueling module at said launch site.

9. A method as claimed in claim 1 wherein said satellite fuel tank has an input connection and wherein the evacuating step includes the step of evacuating an additional remaining amount of propellant from a connection between said fuel transfer line and said input connection of said satellite fuel tank.

10. A method as claimed in claim 1 wherein integrated fueling module has a valve between said fuel transfer line and said vacuum tank, and wherein the evacuating step further comprises the step of opening said valve.

11. A method for loading propellant onto a satellite comprising the steps of:

receiving a fuel transfer tank with a predetermined amount of said propellant from a propellant supplier;

installing said fuel transfer tank in a fueling module;

connecting said fueling module to said satellite with a fuel transfer line;

evacuating said fuel transfer line with a vacuum tank that is part of said fueling module;

driving said propellant from said fuel transfer tank into a into a fuel tank of said satellite;

removing said fuel transfer tank from said fueling module; and shipping said fuel transfer tank with no remaining propellant back to said propellant supplier.

12. A method as claimed in claim 11 wherein the evacuating step comprises evacuating a residual amount of said propellant from said fuel transfer line into said vacuum tank, said method further comprising the steps of:

receiving said vacuum tank with a predetermined vacuum;

installing said vacuum tank on said fueling module;

removing said vacuum tank from said fueling module; and sending said vacuum tank containing said residual amount of propellant to said propellant supplier.

13. An integrated fueling module for loading propellant into a satellite fuel tank through a fuel transfer line comprising:

a fuel transfer tank adapted for being filled with a predetermined amount of propellant, said fuel transfer tank having an input and an output;

a pressurant tank having an output coupled to said input of said fuel transfer tank, said pressurant tank for driving said predetermined amount of propellant from said fuel transfer tank into said satellite fuel tank through said fuel transfer line; and a vacuum tank coupled to said output of said fuel transfer tank, said vacuum tank for evacuating a remaining amount of propellant from said fuel transfer line.

14. An integrated fueling module as claimed in claim 12 wherein said output of said vacuum tank is coupled to said output of said fuel transfer tank is coupled to said output of said fuel transfer tank through a valve wherein said valve is opened to evacuate said remaining amount of propellant from said fuel transfer line.

15. An integrated fueling module as claimed in claim 12 further comprising:

means for removing said fuel transfer tank from said integrated fueling module;

means for filling said fuel transfer tank with said propellant by a propellant supplier;

means for receiving said fuel transfer tank filled with said predetermined amount of propellant; and means for installing said fuel transfer tank on said integrated fueling module.

16. An integrated fueling module as claimed in claim 12 wherein said output of said fuel transfer tank and said vacuum tank are connected to an output of said integrated fueling module, and wherein the integrated fueling module further comprises means for connecting said output of said integrated fueling module to said satellite fuel tank with said fuel transfer line.

17. An integrated fueling module as claimed in claim 12 wherein said pressurant tank contains Helium pressurant, said integrated fueling module further comprising:

a valve on the output of said pressurant tank; and an adjustable pressure regulator coupled between said valve and said input of said fuel transfer tank, said Helium pressurant driving said propellant into said satellite fuel tank when said valve is opened.

18. An integrated fueling module as claimed in claim 12 wherein said pressurant tank contains a pressurant, and said integrated fueling module further comprising:

means for purging said fuel transfer line with said pressurant;

means for pressuring said satellite fuel tank to within a predetermined range using said pressurant; and means for disconnecting said fuel transfer line from said satellite fuel tank.

19. An integrated fueling module as claimed in claim 12 further comprising:

means for receiving said vacuum tank having a predetermined vacuum; and means for removing said vacuum tank.

20. An integrated fueling module as claimed in claim 12 wherein said propellant is hydrazine and wherein said predetermined amount is within plus or minus one pound of an amount of hydrazine required for said satellite fuel tank, and said pressurant tank is filled with pressurized Helium.

* * * * *

UNITED STATES PATENT AND TRADEMARK OFFICE
CERTIFICATE OF CORRECTION

PATENT NO. : 5,582,366
DATED : December 10, 1996
INVENTOR(S) : James E. Hammant et al.

It is certified that error appears in the above-identified patent and that said Letters Patent is hereby corrected as shown below:

In column 10, claims 14,15,16 & 17, first line of each claim, delete "12" and insert --13--.

In column 11, claim 18, line 3, delete "12" and insert --13--.

In column 12, claims 19 & 20, first line of each claim, delete "12" and insert --13--.

Signed and Sealed this

Thirtieth Day of December, 1997

Attest:

BRUCE LEHMAN

Attesting Officer

Commissioner of Patents and Trademarks